United States Patent [19]

Jager et al.

[11] Patent Number: 5,206,336

[45] Date of Patent: * Apr. 27, 1993

[54] PROCESS FOR THE PREPARATION OF NAPHTHALENESULFONIC ACID/FORMALDEHYDE CONDENSATES HAVING A LOW FREE FORMALDEHYDE CONTENT

[75] Inventors: Emmerich Jager, Rohr; Walter Lechner, Linz, both of Austria

[73] Assignee: Chemie Linz Gesellschaft m.b.H., Linz, Fed. Rep. of Germany

[*] Notice: The portion of the term of this patent subsequent to Mar. 31, 2009 has been disclaimed.

[21] Appl. No.: 786,846

[22] Filed: Nov. 1, 1991

Related U.S. Application Data

[63] Continuation-in-part of Ser. No. 653,229, Feb. 8, 1991, Pat. No. 5,101,007.

[30] Foreign Application Priority Data

Feb. 19, 1990 [AT] Austria ................................ 372/90

[51] Int. Cl.$^5$ .................... C08G 12/20; C08G 12/24; C08G 16/02; C08G 75/00
[52] U.S. Cl. ................................. 528/265; 524/3
[58] Field of Search ........................ 524/3; 528/265

[56] References Cited

U.S. PATENT DOCUMENTS

| | | | |
|---|---|---|---|
| 4,256,871 | 3/1981 | Papalos et al. | 528/265 |
| 4,725,665 | 2/1988 | Pieh et al. | 528/247 |
| 5,101,007 | 3/1992 | Jager et al. | 528/265 |

*Primary Examiner*—Paul R. Michl
*Assistant Examiner*—U. K. Rajguru
*Attorney, Agent, or Firm*—Wenderoth, Lind & Ponack

[57] ABSTRACT

Process for the preparation of naphthalenesulfonic acid/formaldehyde condensates having a low content of free formaldehyde, in which the condensation products of naphthalenesulfonic acid and formaldehyde obtained after the condensation, are brought to a pH of greater than 11.5 at a temperature of not less than 80° C. immediately after the condensation, and are kept under these conditions until the desired formaldehyde content is reached. The resins are preferably used as plasticizers for building materials, for example as concrete plasticizers.

5 Claims, No Drawings

PROCESS FOR THE PREPARATION OF NAPHTHALENESULFONIC ACID/FORMALDEHYDE CONDENSATES HAVING A LOW FREE FORMALDEHYDE CONTENT

This is a Continuation-In-Part of Ser. No. 07/653,229, filed Feb. 8, 1991, now U.S. Pat. No. 5,101,007.

The invention relates to a process for the preparation of naphthalenesulfonic acid/formaldehyde condensates having a low content of free formaldehyde.

Naphthalenesulfonic acid/formaldehyde condensates and their use as concrete plasticizers are described, for example, in U.S. Pat. Nos. 2,141,569, 3,686,133 or U.S. Pat. No. 4,725,665. They are prepared by sulfonation of naphthalene with concentrated sulfuric acid and subsequent acid condensation of the naphthalenesulfonic acid formed with formaldehyde at preferably 110° to 160° C. under pressures of up to 30 bar. After the condensation, the mixture is brought to a pH of between 7.5 and 11, preferably to pH 8. The disadvantage of the known napthalenesulfonic acid/formaldehyde condensates lies above all in their relatively high content of free formaldehyde, which is about 0.3% by weight. The high formaldehyde content is undesirable both when the resins are used, for example as additives to cement mixtures, and in the components produced therefrom, since the formaldehyde escapes into the environment and pollutes the environment and is a health hazard.

The aim of the invention was to provide naphthalenesulfonic acid-formaldehyde condensates having a low content of free formaldehyde. Surprisingly, such condensates are obtained if the condensation products of naphthalenesulfonic acid and formaldehyde are treated at a relatively high temperature and relatively high pH immediately after the condensation. The content of free formaldehyde in the condensates according to the invention is below 0.1% by weight, and preferably even below the detection limit, i.e. less than about 0.004 to 0.005% by weight.

The invention accordingly relates to a process for the preparation of naphthalenesulfonic acid-formaldehyde condensates having a low content of free formaldehyde, which comprises the improvement that the condensation product of naphthalenesulfonic acid and formaldehyde is brought to a pH of greater than 11.5 at not less than 80° C. immediately after the condensation, and is kept at this temperature until the desired low content of free formaldehyde is reached.

At higher pH values, the low free formaldehyde content desired is achieved after a relatively short time. The condensates are preferably brought to a pH of greater than 12 after the condensation.

The preferred temperature range is between 85° and 100° C.

The condensation products of naphthalenesulfonic acid and formaldehyde are prepared, for example, in accordance with U.S. Pat. No. 4,725,665 by sulfonation of naphthalene with concentrated sulfuric acid and subsequent acid condensation of the naphthalenesulfonic acid formed with formaldehyde at preferably 110° to 160° C. and under pressures of 1 to 11 bar. According to the invention, the condensation products obtained in this reaction are brought to a temperature of at least 80° C., preferably 85° to 100° C., immediately after the acid condensation, after which a pH of greater than 11.5, preferably greater than 12, is established, and the products are kept at this temperature until the desired low content of free formaldehyde is reached.

Surprisingly, naphthalenesulfonic acid/formaldehyde condensates having such a low content of free formaldehyde are obtained only if this treatment is carried out immediately after the condensation has ended. For example, if the product is cooled to room temperature after the condensation or is kept at a lower pH for some time, the reduction in the formaldehyde content is considerably less successful or becomes impossible. No further reduction in the formaldehyde content is then to be achieved even after prolonged heat treatment.

In a preferred embodiment of the invention, the pH of the naphthalenesulfonic acid-formaldehyde condensates having a low content of free formaldehyde is ultimately adjusted to about 7 to 9, after the desired low content of free formaldehyde is reached by the treatment at a pH of greater than 11.5 at not less than 80° C. immediately after the condensation. This ultimate pH-adjustment can be performed by the addition of acids, e.g. $H_2SO_4$, or by the addition of small quantities of the acidic condensation product obtained before the pH is brought to greater than 11.5. Because only small quantities of acidic condensation product are needed to adjust pH 7 to 9, no change or only a negligible change in the content of free formaldehyde is observed. The main advantage of pH 7 to 9 is especially that the end product can be handled more safely at a pH of higher than 11.5.

The invention furthermore relates to building materials having improved properties and which contain the naphthalenesulfonic acid/formaldehyde condensates according to the invention as an additive, and to a process for the preparation of these building materials. The naphthalenesulfonic acid/formaldehyde condensates according to the invention are preferably used as additives to building materials, such as, for example, cements, plaster and masonry binders, hydraulic limes, non-hydraulic limes, building gypsums, anhydrite binders or magnesia cements. They bring about an improvement in the properties, above all a plasticizing of the building material, for example a cement or concrete mixture, which may mean that less water is required for setting, at a correspondingly higher strength of the component formed.

EXAMPLE 1

A boiler with a stirrer and a device for azeotropic distillation was charged with 964 kg of napthalene melt and 420 l of 96% strength sulfuric acid, and when a sulfonation temperature of 155° C. had been reached, the water of reaction formed was distilled off azeotropically with gasoline. As soon as all of the water of reaction had been removed from the sulfonation mixture, the entraining agent was distilled off.

The boiler was then tightly closed and 882 l of water were added, while cooling. When 120° C. was reached, the mixture was charged with 670 l of 35% strength formalin solution over a period of 30 minutes and then heated to 140° C. Condensation was carried out at this temperature for 90 minutes. 830 l of water were then added to the acid resin (pH 0.8), while cooling, and the mixture was cooled to 95° C. About 450 l of 50% strength sodium hydroxide solution were then added, with gentle cooling, until a pH of 11.7 was reached. The reaction mixture was kept at 95° C. for 3 hours and then cooled to room temperature. The end product had a solids content of 40% by weight. The viscosity was 60 mPa.s (determination in accordance with DIN 52 562).

The formaldehyde content of the condensate was measured immediately after the addition of solium hydroxide solution and in each case after 1, 2 and 3 hours. The measured values and the decrease in the pH are summarized in Table 1.

The formaldehyde content was determined by a method which is described in Z.Anal.Chem. 281, 17–21 (1976) and has been modified in-house:

3–4 g of resin were weighed into a 300 ml glass beaker and dissolved in about 150 ml of distilled water. The pH of the solution was brought to exactly pH 10 (with 0.1N HCl or 0.1N NaOH). About 50 ml of 1 molar sodium sulfite solution, which had likewise been adjusted to exactly pH 10 beforehand, were then added to this solution and the mixture was stirred for 10 minutes. The sodium hydroxide solution resulting from formation of the bisulfite addition product was back-titrated to pH 10 with 0.1N HCl.

Calculation:

$$\% \text{ formaldehyde} = \frac{\text{consumption of 0.1 N HCl} \times 0.3003}{\text{amount weighed in}}$$

The detection limit is about 0.004–0.005% by weight.

EXAMPLES 2 AND 3

Naphthalenesulfonic acid/formaldehyde condensates were prepared analogously to Example 1, with the difference that the products were brought to pH values of 12.2 and 12.6 respectively after the condensation. The formaldehyde content of the condensates and the decrease in the pH after 0, 1, 2 and 3 hours are summarized in Table 1.

COMPARISON EXAMPLES C4 and C5

Naphthalenesulfonic acid/formaldehyde condensates were prepared analogously to Example 1, with the difference that the products were brought to pH values of 10.1 and 11.2 respectively after the condensation. The formaldehyde content of the condensates after 0, 1, 2 and 3 hours is summarized in Table 1.

COMPARISON EXAMPLE C6

Naphthalenesulfonic acid/formaldehyde condensates were prepared analogously to Example 1, with the difference that a pH of 12 was established after the condensation and the product was cooled to room temperature, left at room temperature for 3 hours and then heated to 95° C. and kept at 95° C. for 1 hour. The formaldehyde content of the condensate was 0.24% by weight.

EXAMPLE 7

The following concrete mixture was prepared using the naphthalenesulfonic acid/formaldehyde condensate obtained according to Example 2:
38.96 kg of round grain, 0–4 mm,
12.98 kg of round grain, 4–8 mm,
12.99 kg of round grain, 8–16 mm and
12.0 kg of cement PZ 275 (F) (Perlmooser Zementwerke, Werk Kirchbichl)
were mixed in the dry state in a 65 l Eirich positive mixer for 30 seconds, 4.4 kg of water and after a further 30 seconds 2.23 kg of water were then added and mixing was continued for 1 minute. 90 g of the resin obtained in Example 2 were then added and mixing was continued for one minute. The water/cement ratio was 0.54 and the cement content was 340 kg of cement/m³ of concrete.

For comparison, a concrete mixture was prepared analogously to this, without addition of the resin.

The following properties were measured on the resulting concrete mixtures, in accordance with DIN 1048, Sheet 1 and ÖNORM B 3303:
a) Slump in cm as a measure of the flowability
b) Compressive strength after 18 hours, 28 days (sample cubes of 15 cm edge length).

|  | Slump | Strength (average of 3 determinations) | |
|---|---|---|---|
|  |  | after 18 hours | after 28 days |
| without resin | 35 cm | 8.53 N mm$^{-2}$ | 41.3 N mm$^{-2}$ |
| with resin | 64 cm | 8.71 N mm$^{-2}$ | 41.5 N mm$^{-2}$ |

EXAMPLE 8

Napthalenesulfonic acid/formaldehyde condensates were prepared analogously to Example 1, with the difference that after cooling to room temperature the end product was brought to a pH of 8.5 with 34 l of concentrated H$_2$SO$_4$. The content of free formaldehyde in the condensate was 0.06% by weight.

EXAMPLE 9

Naphthalenesulfonic acid/formaldehyde condensates were prepared analogously to Example 1, with the difference that after cooling to room temperature, the end product was brought to a pH of 8.5 with 45 l of the acid resin, which is obtained according to Example 1 after condensation and addition of water. The content of free formaldehyde in the condensate was 0.06% by weight.

TABLE 1

| Formaldehyde content of the resins | | | | |
|---|---|---|---|---|
| | Heat treatment at 95° C. | | | |
| | after 0 hour | after 1 hour | after 2 hours | after 3 hours |
| Example 1 | | | | |
| Formaldehyde (% by weight) | 0.34 | 0.32 | 0.28 | 0.06 |
| pH | 11.7 | 11.7 | 11.4 | 9.4 |
| Example 2 | | | | |
| Formaldehyde (% by weight)* | 0.33 | neg. | neg. | neg. |
| pH | 12.2 | 12.0 | 11.9 | 11.8 |
| Example 3 | | | | |
| Formaldehyde (% by weight)* | 0.28 | neg. | neg. | neg. |
| pH | 12.6 | 12.7 | 12.7 | 12.7 |
| Comparison Example C4 | | | | |
| Formaldehyde (% by weight) | 0.34 | 0.34 | 0.34 | 0.34 |
| pH | 10.1 | 9.8 | 9.7 | 9.3 |
| Comparison Example C5 | | | | |
| Formaldehyde (% by weight) | 0.34 | 0.33 | 0.32 | 0.30 |
| pH | 11.2 | 11.2 | 10.8 | 10.2 |

*neg. ... below the detection limit

What we claim is:

1. In a process for the preparation of naphthalenesulfonic acid-formaldehyde condensates having a low content of free formaldehyde, the improvement which comprises bringing the condensation product of naphthalenesulfonic acid and formaldehyde to a pH of greater than 11.5 at not less than 80° C. immediately after the condensation, and keeping it at this temperature until the desired low content of free formaldehyde is reached and then bringing the napthalenesulfonic acid-formaldehyde condensates having a low content of free formaldehyde to a pH of 7 to 9, after the desired low content of free formaldehyde is reached.

2. Process for the preparation of naphthalenesulfonic acid/formaldehyde condensates according to claim 1, in which the condensation product is brought to a temperature of 85° to 100° C. immediately after the condensation.

3. Process for the preparation of napthalenesulfonic acid/formaldehyde condensates according to claim 1, in which the condensation product is brought to a pH of greater than 12 immediately after the condensation.

4. Process for the preparation of building materials having improved properties, in which naphthalenesulfonic acid/formaldehyde condensates according to claim 1 are admixed with the building materials.

5. Building materials having improved properties, which contain naphthalenesulfonic acid/formaldehyde condensates according to claim 1 as an additive.

* * * * *